United States Patent
Yun et al.

(10) Patent No.: US 6,816,515 B1
(45) Date of Patent: Nov. 9, 2004

(54) WAVELENGTH-SWEPT LASER AND METHOD FOR ITS OPERATION

(75) Inventors: Seok Hyun Yun, Taejon (KR); Byoung Yoon Kim, Taejon (KR)

(73) Assignees: Korea Advanced Institute of Science and Technology, Taejon (KR); Donam Systems Inc., Taejon (KR)

( * ) Notice: Subject to any disclaimer, the term of this patent is extended or adjusted under 35 U.S.C. 154(b) by 0 days.

(21) Appl. No.: 09/473,450

(22) Filed: Dec. 28, 1999

(30) Foreign Application Priority Data

Apr. 28, 1998 (KR) .......................................... 98-15214
Apr. 28, 1999 (WO) .............................. PCT/KR99/00202

(51) Int. Cl.[7] .......................... H01S 3/098; H01S 3/10; H01S 3/13; H01S 3/08
(52) U.S. Cl. .............................. 372/18; 372/26; 372/19; 372/21; 372/30; 372/98
(58) Field of Search .............................. 372/18, 6, 10, 372/11, 19, 20, 21, 25, 26, 29.023, 30, 98

(56) References Cited

U.S. PATENT DOCUMENTS

| | | | | |
|---|---|---|---|---|
| 4,156,144 A | * | 5/1979 | Pike | 250/423 P |
| 4,951,294 A | * | 8/1990 | Basu | 372/5 |
| 5,079,772 A | * | 1/1992 | Negus | 372/18 |
| 5,101,291 A | * | 3/1992 | Jopson | 359/124 |
| 5,185,814 A | * | 2/1993 | Healey | 385/24 |
| 5,189,676 A | | 2/1993 | Wysocki et al. | 372/6 |
| 5,265,107 A | * | 11/1993 | Delfyett | 372/11 |
| 5,274,659 A | | 12/1993 | Harvey et al. | 372/94 |
| 5,363,386 A | * | 11/1994 | Smith | 372/6 |
| 5,469,454 A | * | 11/1995 | Delfyett, Jr. | 372/18 |
| 5,477,555 A | | 12/1995 | Debeau et al. | 372/25 |
| 5,546,414 A | | 8/1996 | Pfeiffer | 372/18 |
| 5,574,739 A | | 11/1996 | Carruthers et al. | 372/29 |
| 5,812,567 A | * | 9/1998 | Jeon et al. | 372/6 |
| 5,917,969 A | * | 6/1999 | Gavrilovic | 385/15 |

FOREIGN PATENT DOCUMENTS

EP  0612126 A1  8/1994

OTHER PUBLICATIONS

International Search Report from Priority Application No. PCT/KR99/00202, Search Date Sep. 10, 1999.ISA: Austrian Patent Office (all references cited are incorporated herein).

* cited by examiner

*Primary Examiner*—Don Wong
*Assistant Examiner*—Armando Rodriguez
(74) *Attorney, Agent, or Firm*—Marger Johnson & McCollom P.C.

(57) ABSTRACT

The present invention relates to a wavelength-swept laser and a method for generating laser output. The wavelength-swept pulse laser according to one aspect of the present invention uses spontaneous mode-locking to produce a pulse output with the center wavelength continuously varying with time. On the contrary, the wavelength-swept laser according to another aspect of the present invention suppresses mode-locking to produce continuous output by tuning the filter frequency change speed to the frequency shift speed of the frequency shifter. The lasers of the present invention are applicable to optical sensing or WDM optical communication.

24 Claims, 12 Drawing Sheets

1 ms/div 200 ns/div 0.5 ms/div 2 ms/div

WAVELENGTH-SWEPT LASER AND METHOD FOR ITS OPERATION

This application claims priority from Korean Application No. 1998-15214, filed on Apr. 28, 1998, which claims priority from PCT/KR99/00202, filed Apr. 28, 1999, which are hereby incorporated by reference.

TECHNICAL FIELD

The present invention relates to a laser and a method for its operation, more particularly to a wavelength-swept pulse laser producing a short pulsed output with a center wavelength continuously varying with time and a method for generating such wavelength-swept laser pulses.

The present invention also relates to a wavelength-swept laser producing continuous output and a method for generating such wavelength-swept continuous laser light.

BACKGROUND ART

A wavelength-swept laser is a light source whose output wavelength continuously varies with time. Wide-band gain medium and wavelength sweeping means are required to operate such a wavelength-swept laser. The most efficient wavelength sweeping method is to vary the center wavelength of a wavelength tunable filter placed within a laser resonator with time.

For example, Wysocki et al. developed a laser capable of sweeping about 15 nm wavelength range at a rate of a few hundred Hz. The wavelength-swept laser used an erbium doped fiber as the gain medium and an acousto-optic filter as the wavelength sweep element(Reference: Optics Letters, Vol. 15, P879, 1990). Such a wavelength-swept laser together with a wavelength tunable laser is used in wide applications.

The wavelength-swept laser has been used in low interferometric distributed sensors, frequency range distributed sensors and fiber grating array sensors. It can also be used to analyze the wavelength characteristics of an optical device in a short time. Applications in the spectroscopy, optical communication and the like are motivated by the expectation that wavelength-swept lasers will take place of conventional wavelength tunable lasers, but examples of these applications have not been reported.

On the other hand, conventional wavelength-swept lasers have been operated with continuous wave, not with mode-locked wave. To obtain pulse type output, well-known active or passive mode-locking technology is generally required. In the case of the wavelength-swept laser, new mode-locking technology can be developed since the center wavelength of a filter placed within a laser resonator is continuously varied. However, no wavelength-swept laser has been reported that adopts such new mode-locking technology.

In general, a resonator mode of a laser is determined by the condition that the round-trip phase delay of laser light be some integral multiple of $2\pi$. Therefore, the frequency of m-th resonator mode has a value of $f_m = mc/L$, where c is the velocity of light and L is the round-trip optical path of the resonator. If only single resonator mode oscillates in a laser, single frequency laser light with extremely narrow linewidth is obtained. The output power of the laser light has a constant value with respect to time. If several resonator modes simultaneously oscillate, the laser output characteristics can be divided into two different states according to the amplitude and phase of the respective modes. First, if the amplitudes and phases of the modes have arbitrary relations or vary with time, continuous wave output is obtained. In this case, the power of the continuous wave output varies randomly with time due to so-called "mode partition noise". Second, if both the amplitudes and phase differences of the modes are constant, short pulsed output is obtained by the coherent mode interference. This state is called "mode-locking".

There are two techniques to achieve the mode-locking. In the case of active mode-locking, modulation frequency is adjusted equal to some integral multiple of the intermode spacing of longitudinal resonator modes using amplitude modulator, phase modulator, frequency shifter or the like. In the case of passive mode-locking, a saturable absorber, its equivalent optical device or resonator configuration is used.

However, an expensive modulator or an additional saturable absorber is required for the conventional mode-locking techniques.

DISCLOSURE OF INVENTION

It is therefore an object of the present invention to provide a wavelength-swept pulsed laser capable of obtaining short laser pulses without using an expensive modulator or an additional saturable absorber and to provide a method of generating such laser pulses.

It is another object of the present invention to provide a wavelength-swept laser capable of obtaining continuous wave output and to provide a method of generating such a laser output.

In order to accomplish the aforementioned object, the present invention provides a laser, comprising: a resonator having an optical path including therein an optical gain medium capable of amplifying light over wide wavelength band, a wavelength tunable filter with minimum loss center wavelength range, and a non-linear medium with light intensity dependent refractive index; an optical pump means for the population inversion of the optical gain medium; and a filter modulation signal generating means for continuously varying the minimum loss center wavelength range of the wavelength tunable filter with time; wherein the laser output is short mode-locked pulse type and its center wavelength varies continuously with time.

In the invention, the optical gain medium can be any one selected from a rare earth ion doped single mode optical fiber, a rare earth ion doped single mode planar waveguide, a titanium doped sapphire crystal or a Nd—YVO$_4$ crystal.

Moreover, a semiconductor amplifier may be used as the optical gain medium. In this case, the current supplied by a current generator pumps the semiconductor amplifier. Preferably, the current intensity is modulated at the intermode spacing of longitudinal resonator modes or some integral multiple of the intermode spacing to modulate the gain of the semiconductor amplifier, thereby helping the generation of the mode-locked optical pulses as well as adjusting the timing for the pulse generation.

In the invention, the wavelength tunable filter can be any one selected from the group consisting of an acousto-optic wavelength tunable filter, a Fabry-Perot interferometric wavelength tunable filter and a reflective refraction grating with varying reflective center wavelength depending upon rotation.

The wavelength tunable filter may include a beam deflection means and an optical device capable of producing low optical loss only within determined frequency range when the light transmitted or reflected depending on the controlled beam direction is coupled to the resonator. In this case, the beam deflection means can be an acousto-optic modulator that controls the beam direction according to the frequency of the acoustic wave. Otherwise, the beam deflection means may be a multiple phased array that controls the beam direction according to the phase differences of the respective light beams when light beams divided into several optical paths recombine together.

On the other hand, the non-linear medium may preferably include a length of single mode optical fiber or semiconductor material to enhance self-phase modulation effect and to act as a saturable absorber, thereby the non-linear medium helps the generation of mode-locked optical pulses.

However, the gain medium can act as a non-linear medium when the gain medium is a rare earth ion doped optical fiber having high non-linear coefficient or a titanium doped sapphire crystal. In this case, additional non-linear medium is not needed.

The resonator preferably includes an optical amplitude modulator for helping the generation of mode-locking as well as for adjusting the optical pulse generation timing, and a modulation signal generator for supplying alternating electrical signal to the optical amplitude modulator, the frequency of the electrical signal being equal to the intermode spacing of longitudinal resonator modes or some integral multiple of the spacing.

The optical amplitude modulator may be replaced with an optical phase modulator.

In order to accomplish the aforementioned object, the present invention provides a method of mode-locked laser pulse generation, comprising the steps of: preparing within a resonator a wavelength tunable filter and a non-linear medium with light intensity dependent refractive index; transmitting optical pulses in the non-linear medium to broaden the spectrum of the optical pulses by inducing self-phase modulation; tuning the wavelength tunable filter so that the minimum loss wavelength range of the tunable filter can continuously vary with time; and amplifying only selected portions of the broadened optical pulses, the wavelength spectrum of the selected portions being placed around the minimum loss wavelength range.

In the above method, the wavelength tunable filter is tuned so that V is higher than a critical speed $V_c(=\ln(r)\Delta^4/b^2)$ for most of wavelength sweeping time, thereby a plurality of resonator modes can simultaneously oscillate, where V is the variation speed of the minimum loss center wavelength, $\Delta$ is the wavelength spacing between resonator modes, b is the full width at half maximum, $\ln(r)$ is the natural logarithm of the ratio r of the maximum to the minimum light intensity for each mode. In general, $\ln(r)$ has a value in the range of 15 to 25.

In this case, the wavelength tunable filter is preferably tuned by applying electrical signal to the tunable filter with the frequency and/or voltage of the electrical signal continuously and periodically sweeping over a predetermined range. More preferably, a short electrical pulse may be superimposed over the front portion of each repeating waveform of the electrical signal to tune the pulse generation timing to the electrical pulse as well as to help the generation of optical pulses.

In order to accomplish the aforementioned other object, the present invention provides a laser, comprising: a resonator having an optical path including therein an optical gain medium capable of amplifying light over specific wavelength band, a wavelength tunable filter with minimum loss center frequency range, and a frequency shifter shifting the frequency of the light; an optical pump means for the population inversion of the optical gain medium; a filter modulation signal generating means for continuously varying the minimum loss center frequency range of the wavelength tunable filter with time; and means for suppressing the generation of optical pulses by adjusting the frequency shift in said frequency shifter substantially equal to the center frequency change in the wavelength tunable filter for one resonator round trip time; wherein the laser output is continuous wave type and its center frequency varies continuously with time.

Preferably, the frequency shifter is an acousto-optic frequency shifter operating by an alternating electrical signal with a fixed frequency, the acoustic wave generated by the electrical signal giving the refraction and Doppler shift effect to the light.

Otherwise, the frequency shifter and the wavelength tunable filter are comprised of only one acousto-optic wavelength tunable filter. In this case, the frequency change in the electrical signal applied to the acousto-optic filter to change the center frequency of the acousto-optic filter is small with respect to time, the direction of frequency shift being the same with that of the filter center frequency change. The frequency shift for one resonator round trip may be substantially equal to the frequency change in the filter center frequency.

In order to obtain the above laser light, the present invention provides a method, comprising the steps of: preparing a resonator having an optical path including therein a wavelength tunable filter with minimum loss center frequency range, and a frequency shifter; producing a fixed amount $f_{FS}$ of frequency shift for the light passing through the optical path by the frequency shifter; producing continuous change $f_{F1}$ in the center frequency of the wavelength tunable filter for a resonator round trip time; and tuning the wavelength tunable filter so that $f_{FS}$ and $f_{F1}$ have a substantially same value, and the laser output spectrum within the resonator oscillates around the center frequency of the wavelength tunable filter; thereby the generation of optical pulses is suppressed and the laser radiates continuous wave.

In brief, the wavelength-swept pulse laser of the present invention is based on a new finding that sufficient amount of non-linear phase generated by the non-linear medium disposed in the resonator can induce spontaneous mode-locking.

Pulse spectrum is broadened by the self-phase modulation effect and experiences lower filter-dependent optical loss than the continuous oscillation components, thereby inducing mode-locking. According to this method, short stable optical pulses of several pico seconds are obtained without using expensive modulators or saturable absorbers.

BEST MODE FOR CARRYING OUT THE INVENTION

Figure 1A:
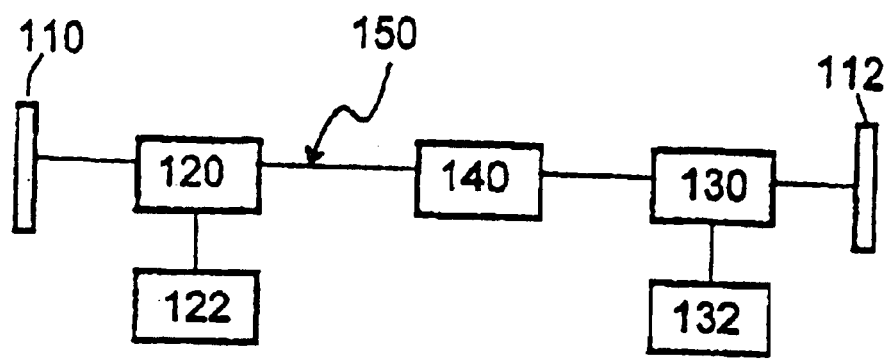
FIGS. 1A and 1B are schematic diagrams of wavelength-swept lasers according to the present invention.
Figure 1B:
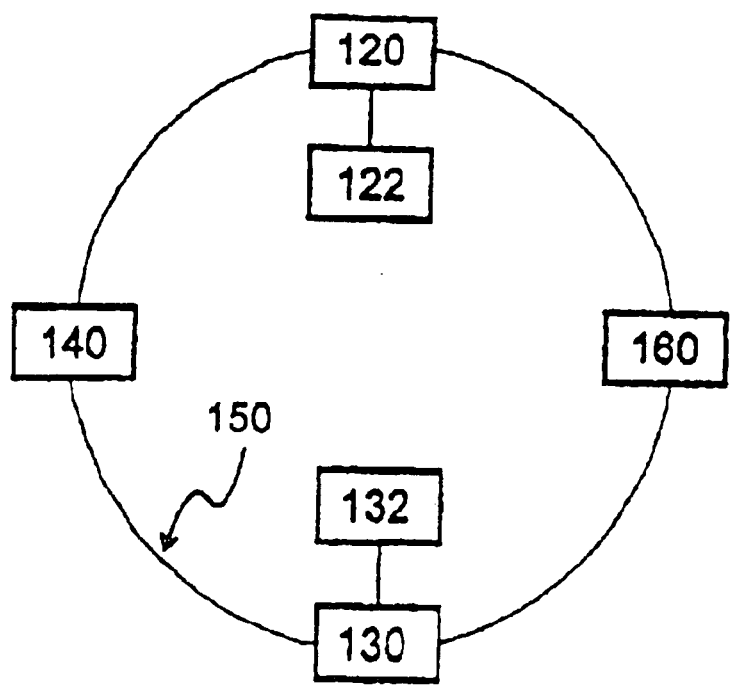

FIGS. 1A and 1B are schematic diagrams of wavelength-swept lasers according to the present invention. FIG. 1A shows one employing a linear resonator, and FIG. 1B another employing a ring resonator.

Referring to FIG. 1A, a light travels back and forth along an optical path 150 between opposing reflectors 110 and 112. During the round-trip, the intensity of the light is amplified by a gain medium 120. An optical pump source 122 excites the gain medium 120, creating population inversion between energy levels so that the laser oscillation can occur. Reference numeral 130 designates a wavelength tunable filter that transmits or reflects light only within a predetermined wavelength range. Electrical signals from a signal generator 132 are applied to the tunable filter 130 so as to modulate the center wavelength thereof. The signal generator 132 can supply electrical signals having various waveforms to the tunable filter 130. For example, the signal generator 132 can modulate the center frequency of the tunable filter 130 to have a triangular waveform or a sawtooth waveform with respect to time. A non-linear medium 140 has an optical property that the refractive index thereof varies with the intensities of incident beams. For example, the index may be determined from the following equation 1.

$$n = n_0 + n_2 I \quad \text{[equation 1]}$$

where $n_0$ is a constant value, I is the beam intensity, and $n_2$ is a non-linear coefficient. In general, the non-linear coefficient is a positive number in most materials, however, materials having a negative coefficient may be used in the embodiment. When short pulsed beam passes through a non-linear medium, the beam intensity at a fixed point in the medium varies with time. The non-linear medium exhibits so-called "self-phase modulation effect" since the optical frequencies for the front and back portions of a pulse are shifted with different directions. The spectrum of the pulse is widely broadened due to the effect. The spectral broadening is one of essential factors affecting the mode-locking involved in the present invention.

One end of the gain medium 120 can take the place of the reflector 110. For example, in the case of use of a semiconductor amplifier as the gain medium 120, one end face of the amplifier facing the non-linear medium 140 is antireflection coated and the other end face thereof is high reflectivity coated or cut at right angle to act as a reflector. Likewise, if a high reflectivity Bragg grating is used as the tunable filter 130, it can take the place of the reflector 112. The optical devices within the resonator are placed in the optical path 150. The optical path can be a free space or an optical waveguide such as a single-mode optical fiber. If an optical fiber having a non-linear coefficient is used as the optical path, the nonlinear medium 140 may not be required. In the resonator configuration as shown in FIG. 1A, the sequences of the optical devices such as the gain medium 120, the non-linear medium 140 and the tunable filter 130 make no difference in the operation of the resonator.

In the case of the ring resonator, the resonator can be configured using a plurality of optical paths and reflectors. Otherwise, an optical fiber can be used as the optical path 150 without the need for reflectors, as shown in FIG. 1B. In any case, a gain medium 120, a nonlinear medium 140 and a wavelength tunable filter 130 are used like that shown in FIG. 1A. Additionally, an optical isolator 160 is incorporated within the ring to ensure travelling-wave operation. In the case of the ring resonator, reflection type gain media or filters can not be used. If the single-mode fiber used in the optical path produces a sufficient non-linear index variation, the non-linear medium 140 is not needed.

The operation of the wavelength-swept laser described above is best understood by reference to FIGS. 2A and 2B.

If a conventional laser employing a filter with fixed center frequency includes a homogeneously broadened gain medium, the laser will produce only one resonator mode output whose frequency is nearest to the center frequency.

However, a wavelength-swept laser with continuously varying center frequency does not operate in the same manner as the conventional one.

Figure 2A:
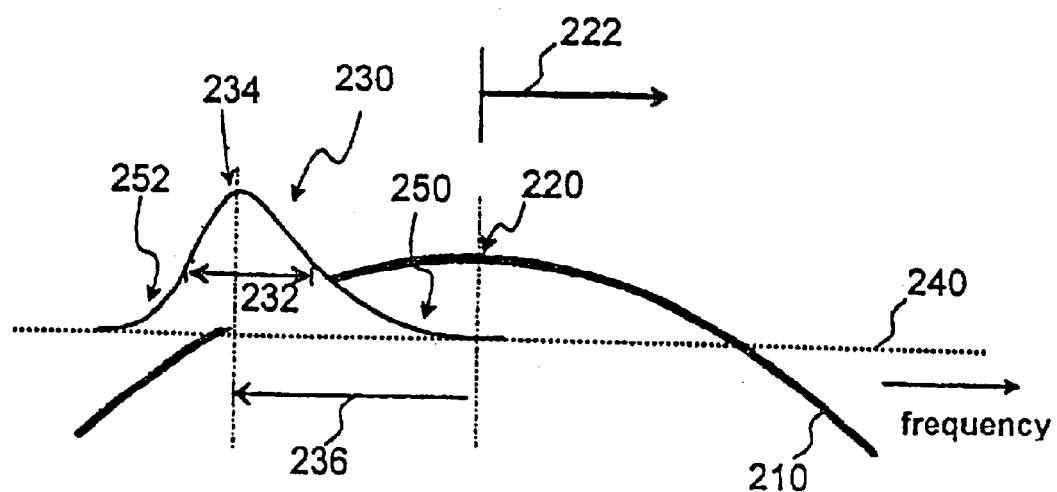
FIGS. 2A and 2B are drawing for explaining the operation of the wavelength-swept laser described in FIGS. 1A and 1B.

In an example of a wavelength-swept laser without a non-linear medium, the laser produces continuous-wave output and the spectrum thereof can be shown as FIG. 2A. In the FIG. 2A, the horizontal axis represents the optical frequency whereas the vertical axis represents the beam intensity or the effective gain level. Referring to FIG. 2A, gain curve 210 reaches a maximum at the filter center frequency 220 and rapidly decreases over the distance from the center with a width determined by the filter bandwidth. In this case, it is assumed that the filter center frequency moves up in frequency with a constant speed with respect to time. An arrow 222 represents the velocity vector of the center frequency movement. If the moving speed is high enough not to allow resonator round-trips such that one resonator mode amplified from spontaneous emission has energy to saturate the gain medium, the laser produces an output in multiple longitudinal modes, not in only one resonator mode. That is, when the varying amount V in the filter center frequency per unit time is larger than a critical speed Vc defined in equation 2, the laser produces an output in multiple longitudinal modes.

$$Vc = \ln(r)\Delta^4 b^2 \quad \text{[equation 2]}$$

where $\Delta(=\lambda^2/L)$ is a wavelength spacing between resonator modes, b is a full width at half maximum(FWBM) of the wavelength filter, and ln(r) is a natural logarithm of the minimum to maximum optical intensity ratio of each mode, having values ranging from 15 to 25 in most cases.

The spectrum curve 230 shows the shape of a laser spectrum at a predetermined instant in time. The curve 230 has a linewidth 232 much broader than the longitudinal mode spacing. The center of the curve 234 is located at a position offset from the center frequency 220 in a direction opposite to the velocity vector 222. It is known that the linewidth 232 and offset 236 are approximately proportional to $(FWHM)^{2/3}$ and $V^{1/3}$, respectively.

The dotted line 240 represents a level that the gain becomes 1. Optical intensity increases in a frequency region where the gain level is higher than 1 whereas it decreases in other frequency region where the gain level is lower than 1. Accordingly, the optical intensity of the spectrum portion 250 near the center 220 increases whereas the optical intensity of the spectrum portion 252 far from the center 220 decreases. As a result, the entire spectrum curve 230 is shifted toward the center 220 after a period of time elapses. That is, the laser spectrum moves together with the movement of the filter center frequency as the above process is repeated. As the spectrum 234 moves toward the center 220, the front frequency components (component near the portion 250 and its right-hand component in FIG. 2A) grow from the spontaneous emission in the gain medium generated by the movement of the filter center frequency. Since spontaneous emission has characteristics such as noise that its frequency components have no phase relations, the laser produces a continuous-wave output and the output has the same statistical characteristics as amplified spontaneous emission.

Figure 2B:
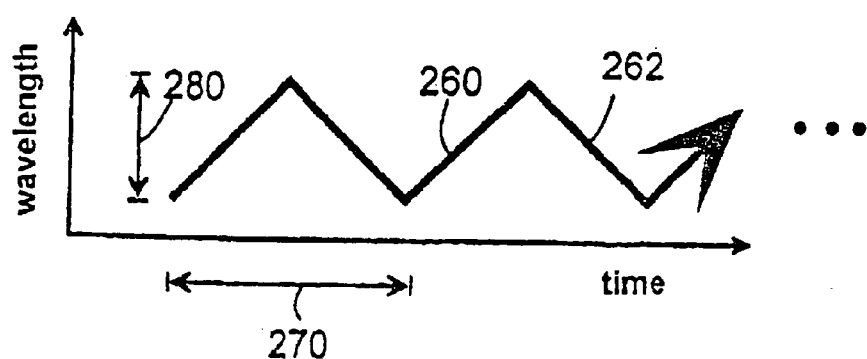

On the other hand, if the filter center frequency moves according to a triangular waveform with respect to time, the laser output wavelength varies as shown in FIG. 2B. Referring to FIG. 2B, the output wavelength is linearly increased (260) and decreased (270) with a repetition of a predetermined period. The repetition period 270 of the wavelength variation can not exceed a constant value by the limitations such as the filter tuning speed and the relaxation time of the laser gain medium. Especially when the repetition rate of the frequency variation approaches to the relaxation oscillation of the laser resonator, large relaxation oscillation occurs. Therefore, a gain medium with high-speed operation characteristics and a wavelength filter with high tuning speed are required in order to increase the repetition rate. The maximum value of the wavelength variation range 280 is determined by both the filter tuning range and the bandwidth of the gain medium. The wavelength variation range of a rare-earth ion doped fiber may amount to maximum several tens of nanometers while those of some semiconductors or solid crystals may amount to 100 nm or more.

In another example of a wavelength-swept laser with a resonator including a nonlinear medium therein, the spectrum of weak optical pulses generated in the resonator is broadened due to the self-phase modulation effect of the non-linear medium as described above. Unlike spontaneous emission, each frequency component in the broadened spectrum components has specific phase relations. If the intensity of the broadened components is higher than that of spontaneous emission around the filter center frequency region, the laser spectrum, which will be grown in the region, will have specific relations for each frequency component. The mode-locking according to such specific relations between modes makes the laser capable of producing pulsed output.

Since mode-locked pulses transfer energy to a frequency region where the filter frequency will move due to the spectrum broadening, light seeds can rapidly grow in the frequency region, reducing the offset 236 of FIG. 2A. It is therefore possible to obtain high intensity light because filter dependent optical loss is reduced with the reduction of the offset 236. That is, pulse components provide advantages in terms of laser oscillation since pulse components suffer less optical loss than continuous oscillation components. To achieve mode-locking, the spectrum components generated by the non-linear medium around the filter frequency center should have similar or higher power density comparing to the light components spontaneously emitted from the gain medium. Accordingly, to lower the mode-locking threshold, it is desirable to use a non-linear medium with increased non-linear coefficient or to use a low noise figure gain medium emitting lower spontaneous light.

The gain medium may be selected from the group consisting of a rare earth ion doped single mode optical fiber, a rare earth ion doped single mode planar waveguide, a titanium doped sapphire crystal, and a Nd—YVO$_4$ crystal.

The wavelength filter may be selected from the group consisting of a Fabry-Perot filter, an acousto-optic filter, a reflection type Bragg grating, a fiber Bragg grating, a filter comprised of an acousto-optic beam deflector and a reflection type Bragg grating, a filter comprised of a beam deflector and a reflector, a filter comprised of a waveguide beam deflector and a reflection type Bragg grating, and a filter comprised of a waveguide beam deflector and a reflector.

A semiconductor saturable absorber, a single-mode optical fiber or the like may be used as the non-linear medium. If a high non-linear coefficient gain medium such as a rare earth ion doped optical fiber and a titanium doped sapphire crystal is used, additional nonlinear medium is not needed.

Figure 3:
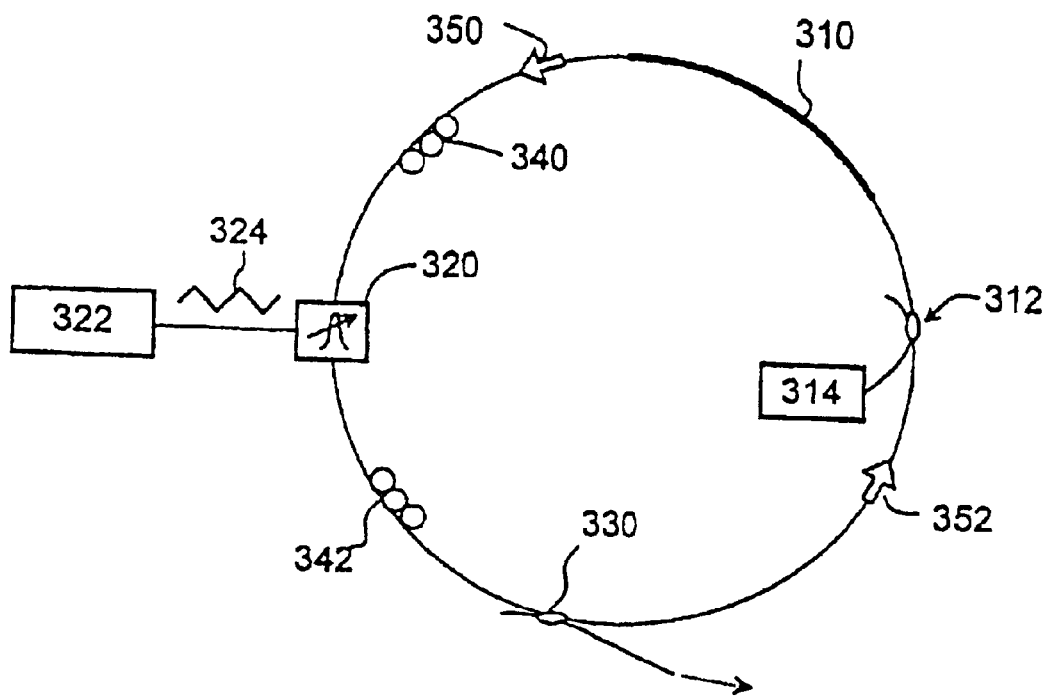
FIG. 3 is a schematic diagram of a wavelength-swept fiber laser according to an embodiment of the present invention.

FIG. 3 is a schematic diagram of a wavelength-swept fiber laser according to an embodiment of the present invention.

An erbium ion doped fiber 310 is used as a gain medium in a ring type resonator whose optical path is comprised of communication-grade single mode fibers. The rate of absorption was about 12 dB/m at 1550 nm wavelength for the erbium-doped fiber. Referring to FIG. 3, 1470 nm pump beam from a laser diode 314 is introduced through a wavelength-division multiplexing fiber coupler 312. A Fabry-Perot etalon filter 320 (FWHM=0.23 nm, free spectral range=33 nm) tuned by a piezoelectric transducer is used as a wavelength filter. The center frequency variation of the filter 320 was 14 nm for a 1V change of voltage applied to the transducer. In the operation of this laser, a frequency signal generator 322 generated a 2V amplitude triangular wave so that the center frequency of the wavelength filter might linearly sweep about 28 nm wavelength range. Laser output is obtained through a fiber decoupler 330 of 50% coupling ratio. The polarization of the laser light is controlled by two polarization controllers 340 and 342 disposed within the resonator so as to obtain most stable laser output regardless of achieving mode-locking. Two optical isolators 350 and 352 are disposed at both ends of the gain medium to ensure unidirectional laser oscillation. Without isolators, bidirectional mode-locking will occur. The total length of the resonator was 17.2 m, and the total optical loss was 10 dB including losses such as 4 dB at the filter, 3 dB at the output optical decoupler and 0.5 dB at both optical isolators. All fibers within the resonator are silica-based ones having similar non-linear coefficients. However, self-phase modulation will mostly occur around the end of the erbium ion doped fiber 310 with small mode diameter where light intensity becomes highest. The erbium ion doped fiber 310 has a mode diameter of only about 3.6 microns whereas a conventional single-mode fiber has a mode diameter of 9 microns.

Figure 4:
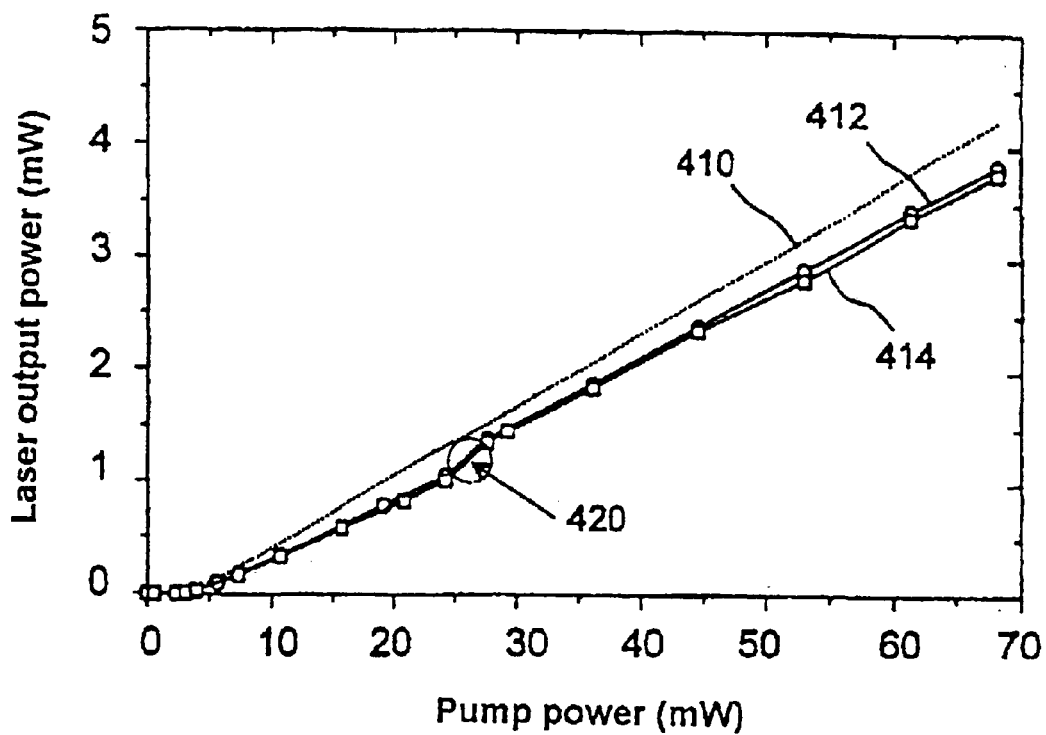
FIG. 4 is a graph of output power of the laser shown in FIG. 3 as a function of pump power.

FIG. 4 is a graph of output power of the laser shown in FIG. 3 as a function of pump power.

The dotted line 410 represents laser output power at 1550 nm wavelength measured when a constant voltage is applied to the wavelength filter. The lines 412 and 414 show results measured when 2V amplitude triangular waves of 200 Hz and 600 Hz are applied to the filter, respectively. In all cases, continuous laser oscillation begins to occur when the pump power approaches to about 4 mW. Without filter modulation, laser output power linearly proportional to the pump power can be obtained. When the filter is modulated, continuous oscillation is initially obtained, however, mode-locked pulse output is obtained with pump power more than 25 mW as is shown in the circle 420. As is understood from the slope change of the lines in the circle 420, the start-up of mode-locking abruptly increases laser output power. This result suggests that effective optical loss be reduced by the pulse generation.

Figure 5A:
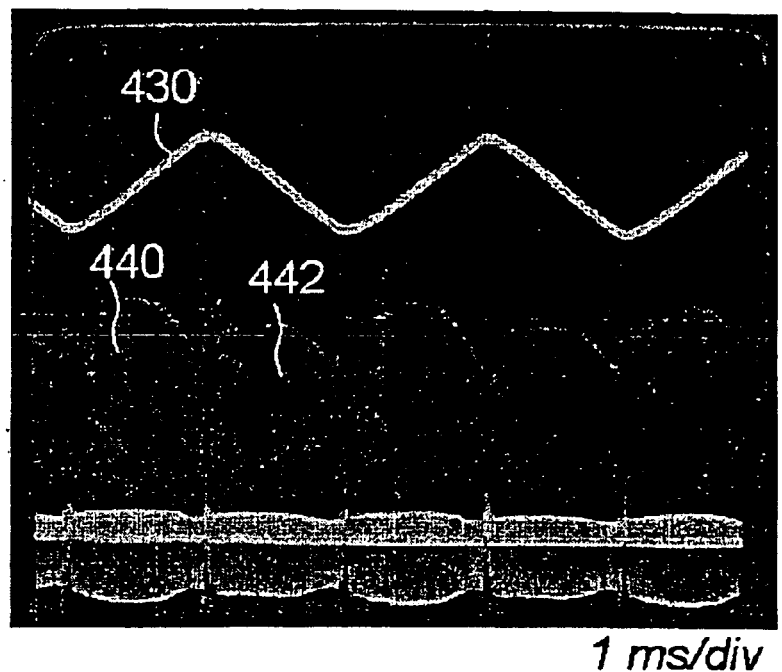
FIG. 5A and 5B are photographs of output power of the laser shown in FIG. 3 measured using an oscilloscope.

FIG. 5A is a photograph of output power of the laser shown in FIG. 3 measured using an optical detector of 50 MHz bandwidth and an oscilloscope. Pump power was about 35 mW.

The upper signal 430 is a triangular wave of 2V amplitude and 250 Hz frequency that is applied to the filter. The lower signals 440 and 442 show a mode-locked pulse train. Though it is difficult to discriminate pulses from this photograph, output wavelength-increased signal 440 is obtained with the increase of the applied voltage whereas output wavelength-decreased signal 442 is obtained with the decrease of the applied voltage. The height of the pulse train is not constant depending on the wavelength because the gain level of the erbium ion doped fiber is different with wavelength change. It is believed that the shape difference between the signals 440 and 442 is mainly due to asymmetric characteristics of the filter. The respective number of pulses in the signals 440 and 442 at 27 nm wavelength is about 24100 since the resonator round trip is 83 ns and the half period of wavelength sweep is 2 ms.

Figure 5B:
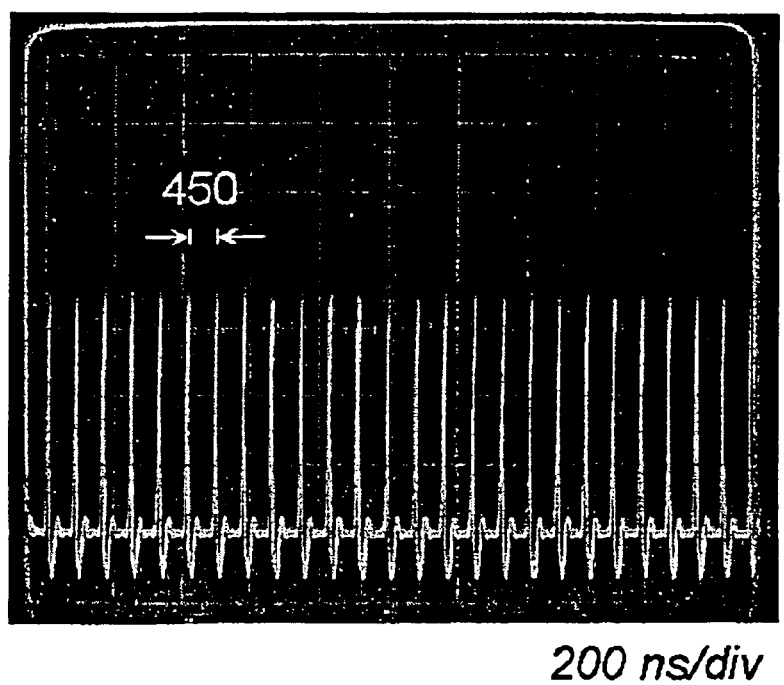

FIG. 5B is a photograph of output power of the laser shown in FIG. 3 measured as a function of shorter time scale. Referring to FIG. 5B, the pulses are discriminated from each other with a spacing 450 corresponding to the resonator round trip spacing, but it is understood that pulse generation timing is not synchronized with the electrical signal 430. Time fluctuation in the timing is larger than 100 ns, and all pulses are observed to be generated at random different positions when using an electrical signal of the oscilloscope as a trigger. This is believed to be a result that mode-locking occurs from noise pulses. Fluctuation in the chaotic characteristics coming from filter tuning is also believed to cause the result. Therefore, it is desirable to control the pulse timing intentionally. If a short electrical pulse is superimposed over the front portion of each repeating waveform of the electrical signal applied to the filter, the pulse timing can be synchronized by generating instantaneous optical noise pulses. Otherwise, an amplitude modulator or a phase modulator can be incorporated in the resonator to perform a modulation corresponding to the period of the longitudinal resonator mode so that pulses are generated at maximum amplitude time or constant phase time.

In case of using a semiconductor amplifier as a gain medium, the intensity of the current applied to the amplifier may be modulated corresponding to longitudinal resonator mode periods or its integral multiples so as to generate pulses at a time of obtaining highest gain level.

Figure 6:
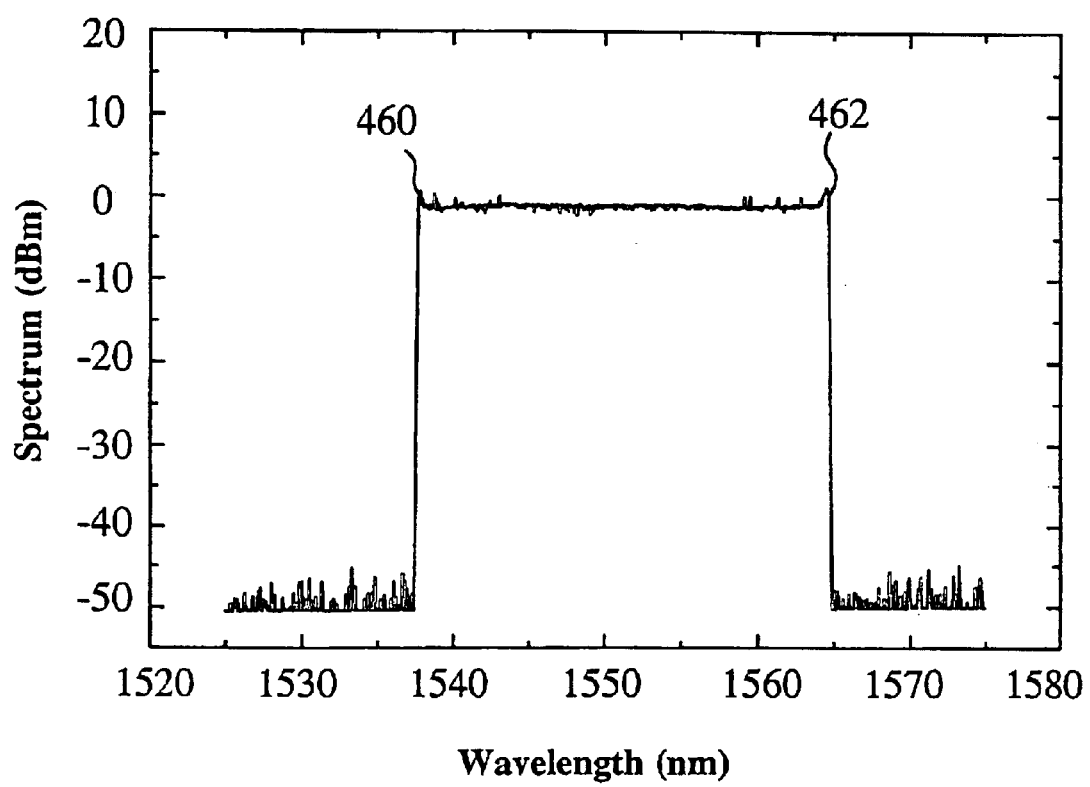
FIG. 6 is a graph of laser output spectrum measured in peak-hold mode of an optical spectrum analyzer.
Figure 7A:
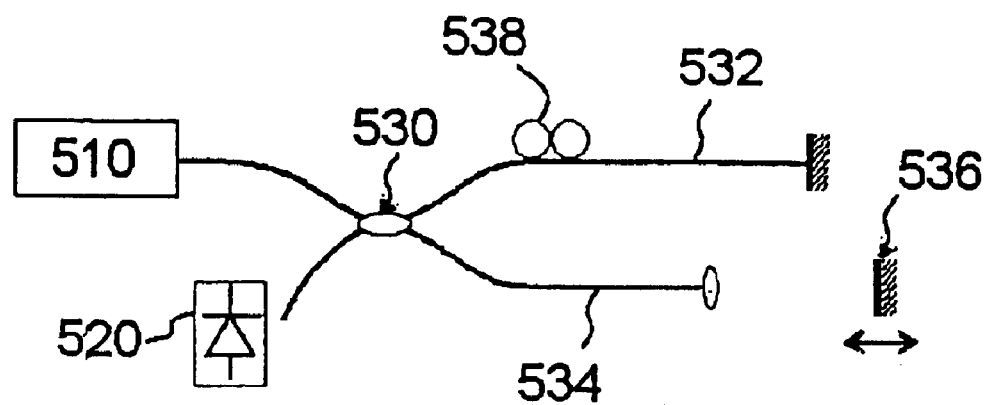
FIG. 7A is a schematic diagram of the apparatus used for measuring instantaneous linewidth of the output spectrum of the wavelength-swept laser shown in FIG. 3.

FIG. 6 is a graph of laser output spectrum measured in peak-hold mode of an optical spectrum analyzer. The laser output was produced on the same condition as FIG. 5A. Referring to FIG. 6, the laser spectrum has a narrow linewidth at an instant of time, but when measured on a long time scale, the peak value sweeps 27 nm range from 1538 nm (minimum wavelength 460) to 1565 nm (maximum wavelength 462). Adjusting the amplitude of the signal applied to the filter can change the wavelength sweep range FIG. 7A is a schematic diagram of the apparatus used for measuring instantaneous linewidth of the output spectrum of the wavelength-swept laser shown in FIG. 3. Referring to FIG. 7A, the output of the wavelength-swept laser 510 is introduced to a Michelson interferometer, and the output thereof is measured using an optical detector 520 and an oscilloscope. The laser output is divided between two arms 532 and 534 of the Michelson interferometer through a 50% fiber coupler 530. The optical path difference between two arms can be adjusted to about 4 cm from a reference point by moving a reflector 536 linearly. A polarization controller 538 is controlled such that lights combined at the coupler 530 after reflection have the same polarization. When the optical path difference is L, the interferometer acts as a filter whose transmittance for a range of wavelengths is proportional to a square of cosine function with $\lambda^2/L$ period, where $\lambda$ is the wavelength of the incident light. Since laser output wavelength varies with time, the light power also varies periodically with time after travelling the interferometer.

Figure 7B:
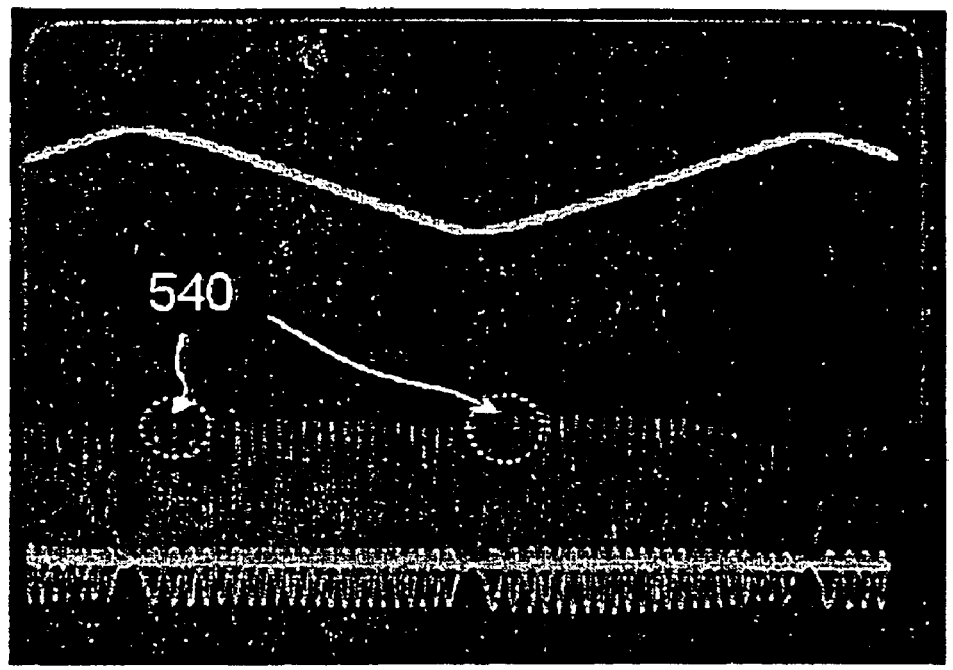
FIG. 7B is a photograph of the signals detected in the optical detector 520 of FIG. 7A when the optical path difference is 2 mm.

FIG. 7B is a photograph of the signals detected in the optical detector 520 of FIG. 7A when the optical path difference is 2 mm. The modulation wavelength spacing of the signal was 1.2 nm and wavelength sweep repetition rate was 250 Hz. It will be understood that total wavelength sweep range is 27 nm since about 22.5 cycles exist for a wavelength increasing or decreasing time. The time interval of the intensity modulation cycle at the front portion 540 of each wavelength sweep is slightly larger than that at other positions because the response of the piezoelectric transducer is not sufficiently fast and has non-linear characteristics.

Figure 7C:
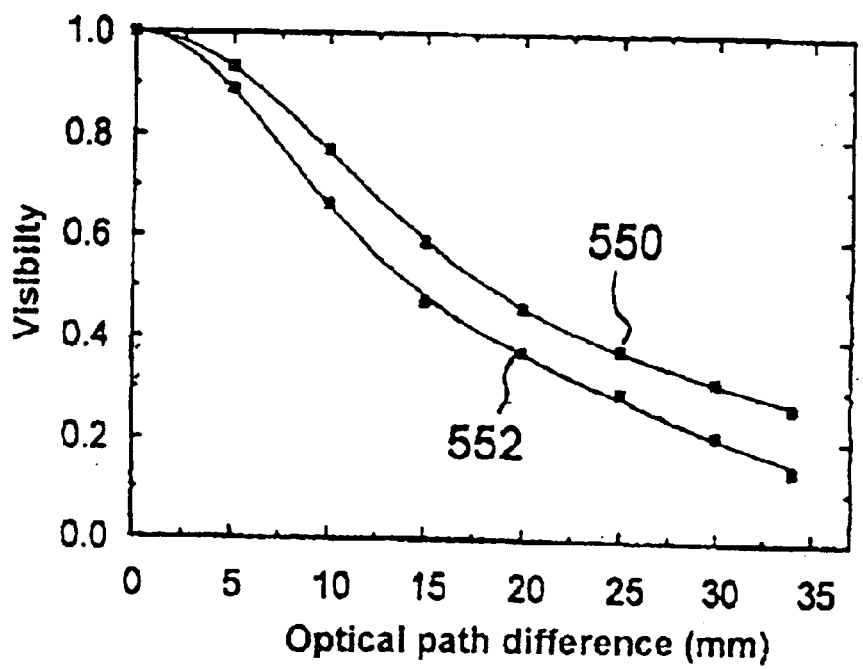
FIG. 7C is a graph of the visibility versus optical path difference L at a wavelength sweep repetition rate of 600 Hz.

FIG. 7C is a graph of the visibility versus optical path difference L at a wavelength sweep repetition rate of 600 Hz. Two curves 550 and 552 represents results measured at wavelength increase and decrease, respectively. The two curves agree well with two Gaussian functions with size ratio=3:1 and linewidth ratio=1:3. The laser spectrum does not conform in shape to a simple Gaussian function since too great self-phase modulation occurs due to highly non-linear effect of the non-linear medium. In the cases of lower non-linearity, higher wavelength sweep speed or narrower filter width, single Gaussian spectrum will be obtained with pulses of a Gaussian shape. Higher pump power will produce great self-phase modulation, however, laser output power will become unstable because a laser pulse tends to divide into several pulses due to high non-linearity. Referring to FIG. 7C, the visibility 552 for wavelength increase is observed to decrease more rapidly with increasing optical path difference than the visibility 550 for wavelength decrease, which indicates that wider laser linewidth can be obtained for wavelength increase. Such observed result could be explained by third-order chromatic dispersion effect with respect to frequency, which is a characteristic of the Fabry-Perot filter. As describe above, when the wavelength increases or decreases, the position of the laser spectrum has offsets in opposite directions with respect to the filter center. In terms of the chromatic dispersion of the filter, the frequency region higher than the filter center frequency is a so-called anomalous chromatic dispersion region whereas the frequency region lower than the filter center frequency is a normal chromatic dispersion region. With the increase in the laser wavelength, the laser spectrum will have a frequency region higher than the filter center frequency. Thus, this anomalous chromatic dispersion and the self-phase modulation by a non-linear medium give a soliton effect with reduced pulse width and wider spectrum. On the contrary, with the decrease in the laser wavelength, the dispersion by the filter will broaden the pulse, resulting in increased pulse width and narrower spectrum. In the case where the filter width is narrower than 1 nm, since the dispersion by the filter is dominant comparing to the dispersion given by several tens meter fiber, the chromatic dispersion by the fiber is negligible. In the case of using an acousto-optic filter, the filter has no such asymmetric characteristics. On the other hand, too great self-phase modulation may make the sign of the offset opposite, which will deviate the shape of the pulse from a Gaussian function. And the above-described asymmetry will become more complex.

Optical pulse width was measured using auto-correlation by the generation of second harmonics. It is understood from the experiment that the pulse shapes of all cases agree well with a Gaussian function. The respective pulse-widths were measured at a wavelength sweep repetition rate of 1 kHz when the wavelength alternately increases and decreases, which gives the result that the width measured with wavelength decrease is wider by about 10% width difference. This result corresponds to the above result that the linewidth measured with wavelength decrease is narrower by about 10% linewidth difference.

Figure 8A:
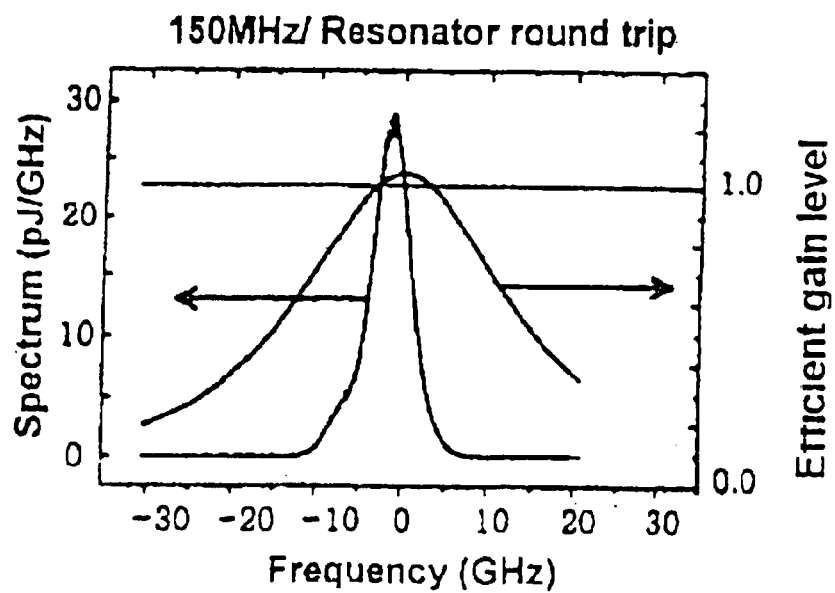
FIGS. 8A to 8D are graphs of the output power spectrum and the optical pulse in the wavelength-swept fiber laser of FIG. 3, which are obtained from computer simulations.
Figure 8B:
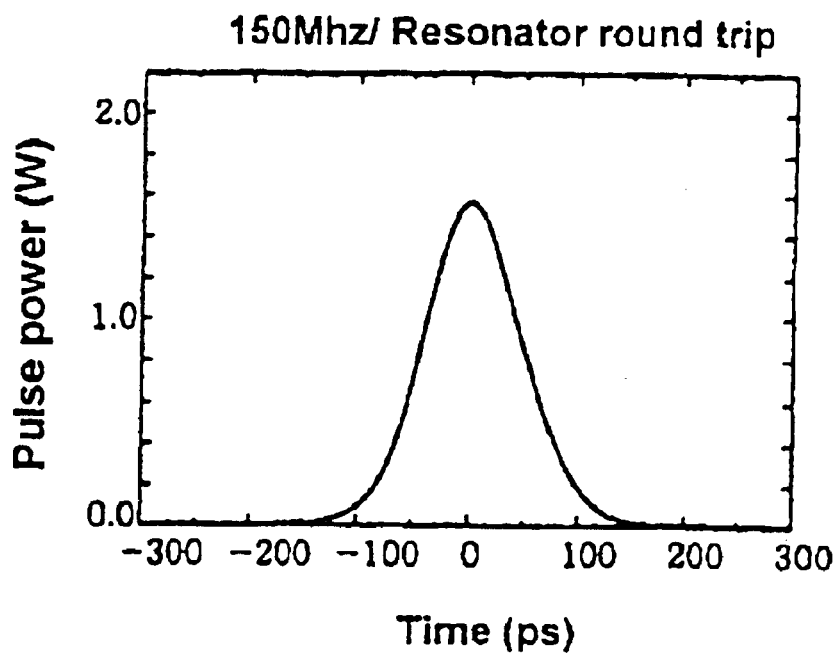
Figure 8C:
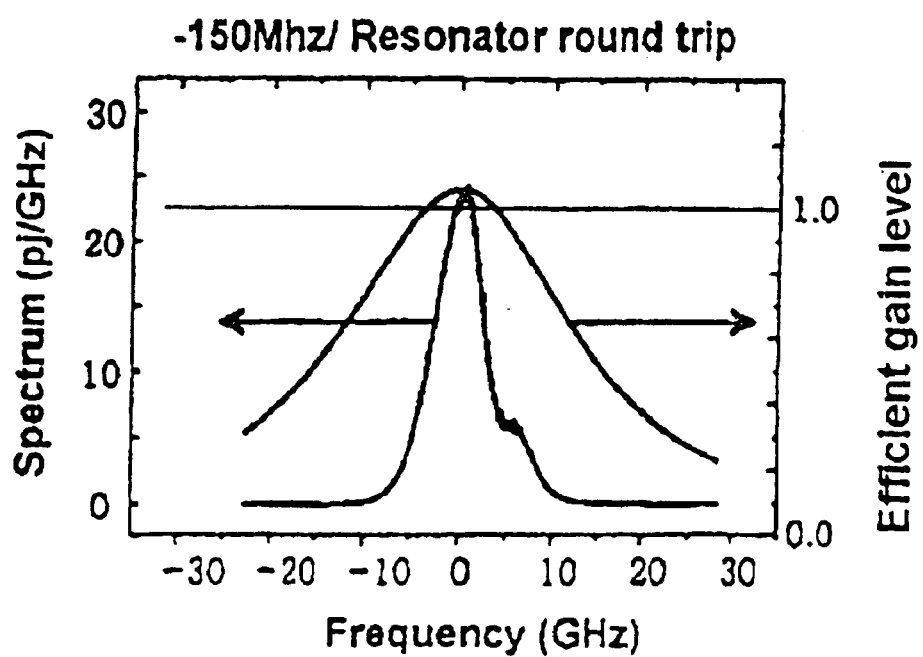
Figure 8D:
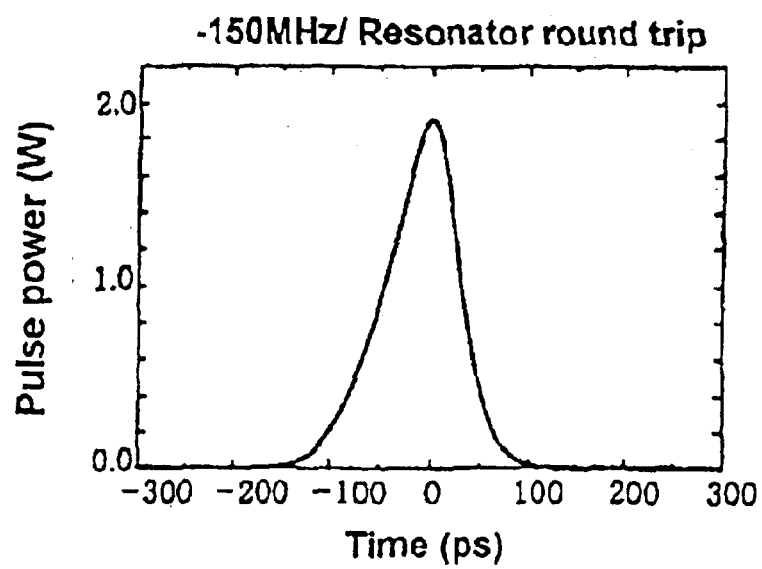

FIGS. 8A to 8D are graphs of the output power spectrum and the optical pulse in the wavelength-swept fiber laser of FIG. 3, which are obtained from computer simulations. In the simulations, the parameters such as resonator optical loss, gain level of erbium ion doped fiber, resonator length, chromatic dispersion of fiber, wavelength filter linewidth and nonlinear parameter were all selected from the values used in the real experiments. The effective length of the non-linear medium as a free parameter was selected from a value giving results most similar to the real experiment results. The effective length corresponds to 2 m erbium ion doped fiber length on the basis of the value giving highest light power in the resonator. The simulation results of FIGS. 8A to 8D were obtained at a wavelength sweep range of 28 nm, a repetition rate of 250 Hz and a laser output power of 2.1 mW. FIGS. 8A and 8B show the spectrum and pulse, respectively, when the filter frequency increases by 150 MHz for a resonator round trip (that is, when the laser output wavelength decreases by 1.2 pm). FIGS. 8C and 8D show the spectrum and pulse, respectively, when the filter frequency decreases with the same speed as the above case. It is clearly shown that the maximum of the spectrum deviates from the filter center (that is, the center of effective gain curve) and the spectrum is not simple Gaussian-shaped: Thus, the optical pulse is also not simple Gaussian-shaped. The products of the pulse width and linewidth for wavelength decrease and increase were 0.43 and 0.47, respectively.

In a computer simulation where the effective length of the non-linear medium is several times shorter than 2 m, the offset of the spectrum is increased, and both the spectrum and the pulse become Gaussian-shaped. On the contrary, as the effective length increases from 2 m, the spectrum is divided into several pieces after passing through unstable state, resulting in the generation of a plurality of optical pulses. That is, the state becomes stable when the spectrum is divided into several pulses so as to reduce the self-phase modulation effect since the self-phase modulation for a single pulse is too great in the resonator.

Figure 9A:
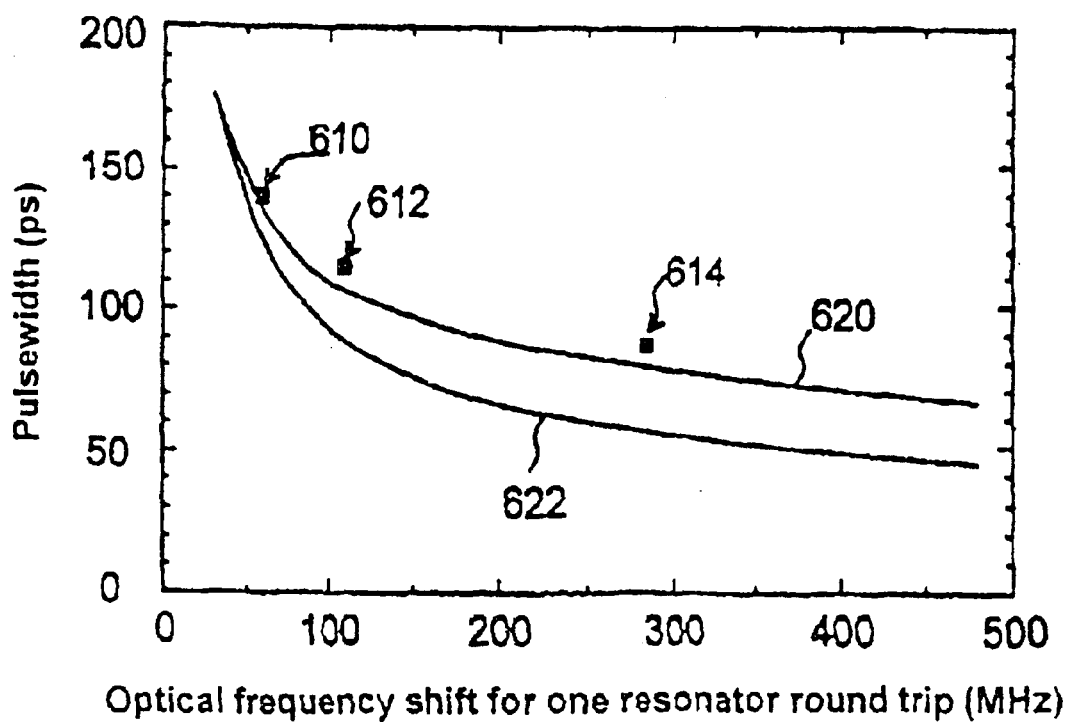
FIGS. 9A and 9B are graphs comparing the measurements with the computer simulation data for the pulse width and linewidth of the wavelength-swept fiber laser of FIG. 3.
Figure 9B:
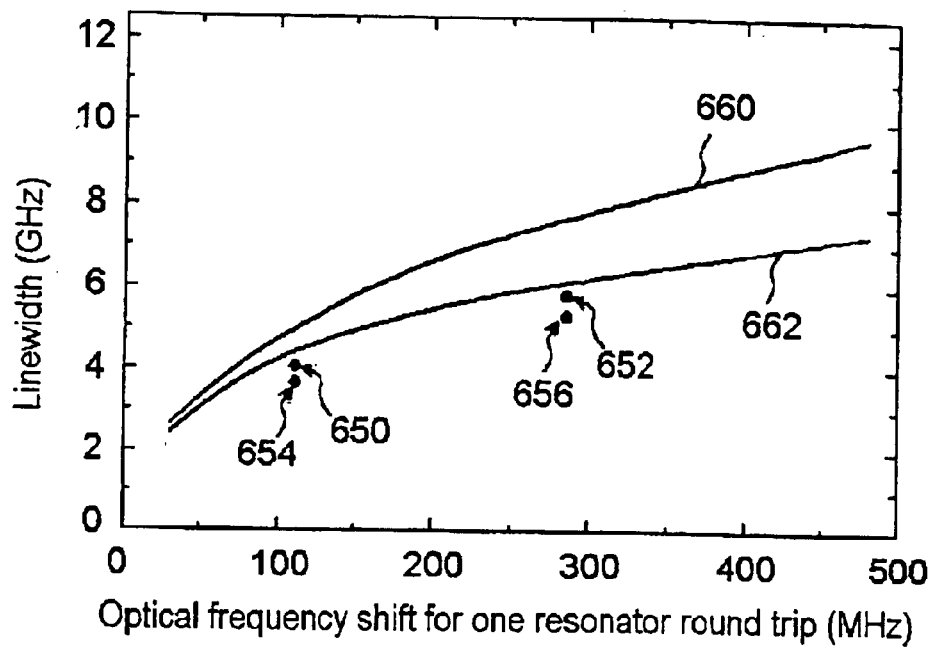

FIGS. 9A and 9B are graphs comparing the measurements with the computer simulation data for the pulse width and linewidth of the wavelength-swept fiber laser of FIG. 3. The measured values were obtained regardless of wavelength increase or wavelength decrease. In FIG. 9A, the black squares represent the measurements at 100 Hz (610), 200 Hz (612) and 600 Hz (614) wavelength sweep repetition rates, respectively. The horizontal axis is represented by optical frequency shift of the filter center frequency for one resonator round trip. Curves 620 and 622 are computer simulation data obtained when the wavelength decreases and increases, respectively.

The linewidth was separately measured for wavelength increase and decrease. In FIG. 9B, points 650 and 652 respectively represent linewidths measured at the wavelength sweep repetition rates of 200 Hz and 600 Hz in the case of wavelength increase. Points 654 and 656 respectively represent linewidths measured at the same wavelength sweep repetition rates in the case of wavelength decrease. Curves 660 and 662 are computer simulation results for the cases of wavelength increase and decrease, respectively. Measured values and simulation results are slightly different in their absolute values, but they agree well with each other in terms of variation trend and asymmetry according to the wavelength sweep speed and direction.

As a result, a stable optical pulse with about 100 ps width could be obtained in the embodiment without using additional optical devices such as expensive modulators or suturable absorbers.

As described above, one of the basic conditions for the mode-locking is that the continuous variation in the filter frequency gives asymmetric optical loss to the laser spectrum. Thus, mode-locking will not occur if optical spectrum moves with the same speed as the filter frequency variation. On the basis of this finding, a wavelength-swept laser, capable of producing continuous output, according to another embodiment of the present invention has been developed.

Such a wavelength-swept laser can be provided by disposing an acousto-optic frequency shifter between the output optical decoupler 330 and the optical isolator 362 in the laser resonator of FIG. 3. In the embodiment, the frequency shifter, with almost constant transmittance over a wide range of 100 nm around 1550 nm, is driven by an alternating signal of 54 Mz frequency and increases the optical frequency by 54 MHz. The resonator length was increased to 19.2 m due to the frequency shifter. Accordingly, in the case of wavelength sweep range 28 nm, about 83 Hz triangular wave signal should theoretically be applied to the filter in order to shift the filter center with the same speed 580 GHz/ms as that of frequency variation.

Figure 10:
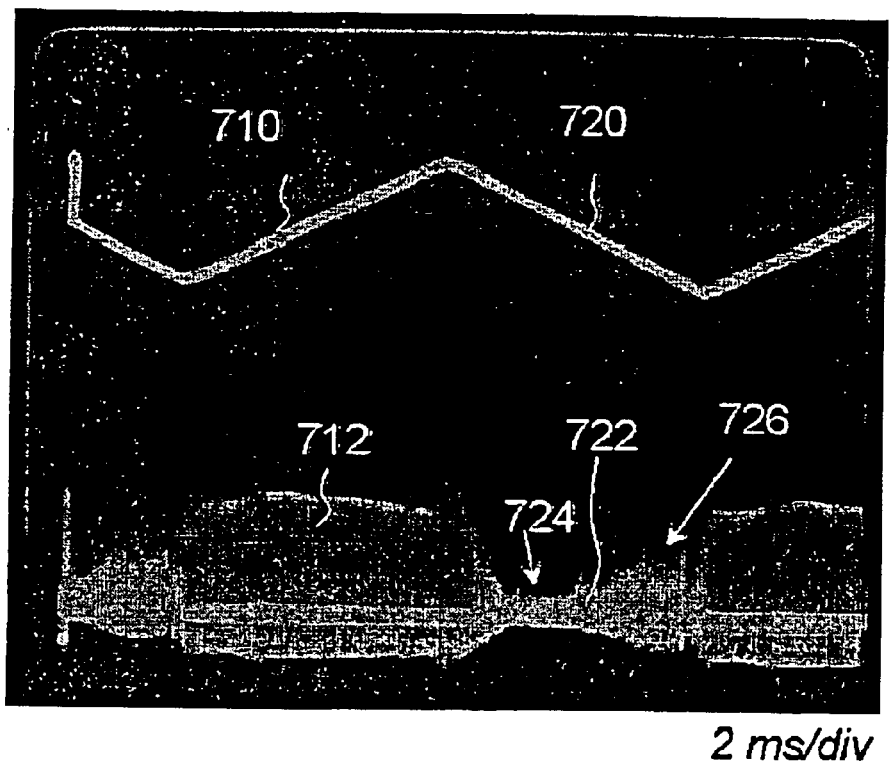
FIG. 10 is an oscilloscope photograph of the output of the wavelength-swept laser according to another embodiment of the present invention.

FIG. 10 is an oscilloscope photograph of the output of the wavelength-swept laser according to another embodiment of the present invention. The output was obtained while applying a triangular wave signal of frequency 77 Hz and amplitude 2V to the acousto-optic frequency shifter.

The voltage increase 710 in the triangular wave corresponds to the frequency decrease 712 in the laser output. In this case, pulses are generated due to mode-locking since the moving direction of the filter center is opposite to the direction of frequency shift.

On the contrary, the voltage decrease 720 in the triangular wave corresponds to the frequency increase 722 in the laser output. In this case, the frequency of the laser light is shifted corresponding to the filter moving speed so that the laser oscillation can occur around the filter center. Accordingly, the laser can maintain continuous oscillation due to suppressed mode-locking. As shown in FIG. 10, the frequency shift corresponds well to the wavelength filter moving speed around the position 724.

Since the filter center does not make a perfect linear sweep due to the non-linear property of the piezoelectric transducer within the filter, the positions such as a position 726 show several Hz difference between the wavelength sweep and the frequency shift. Mode-locking does not occur at the positions, but the laser output power is considerably unstable accompanying relaxation oscillation.

That is, continuous oscillation can be realized by suppressing optical pulse generation through the method of adjusting the amount of frequency shift in the frequency shifter substantially equal to the center frequency change in the wavelength tunable filter for one resonator round trip time.

The method of operating such a wavelength-swept laser comprises the following steps.

Initially, a wavelength tunable filter with minimum loss center frequency region and a frequency shifter are disposed in a laser resonator. Then, the frequency of light in the resonator is shifted by a predetermined amount of $f_{FS}$ using the frequency shifter and the center frequency of the wavelength tunable filter is tuned to continuously change by $f_{F1}$ for one resonator round trip time. The wavelength tunable filter is controlled so that $f_{FS}$ and $f_{F1}$ can have a substantially equal value, and thereby continuous laser oscillation is maintained. By carefully matching the two values, $f_{FS}$ and $f_{F1}$, the laser can be arranged to oscillate in only one longitudinal mode. In this case, scanning single frequency output can be obtained.

In conclusion, it was demonstrated that continuous laser oscillation can be obtained without mode-locking by tuning the filter frequency change speed to the frequency shift speed of the frequency shifter.

Figure 11A:
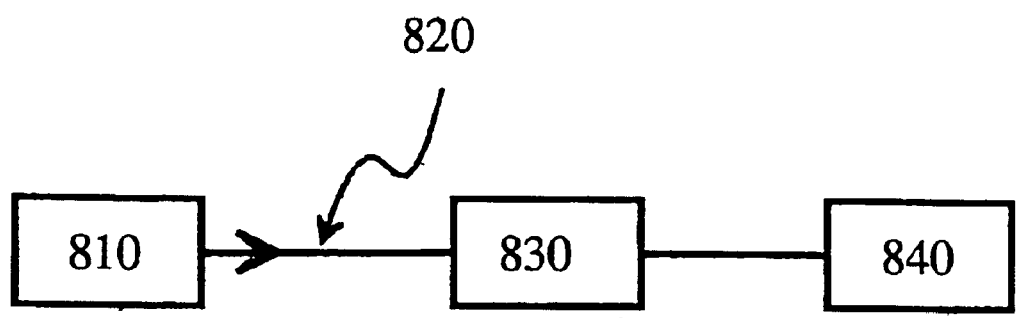
FIGS. 11A and 11B show application concepts of the wavelength-swept laser according to another embodiment of the present invention.
Figure 11B:
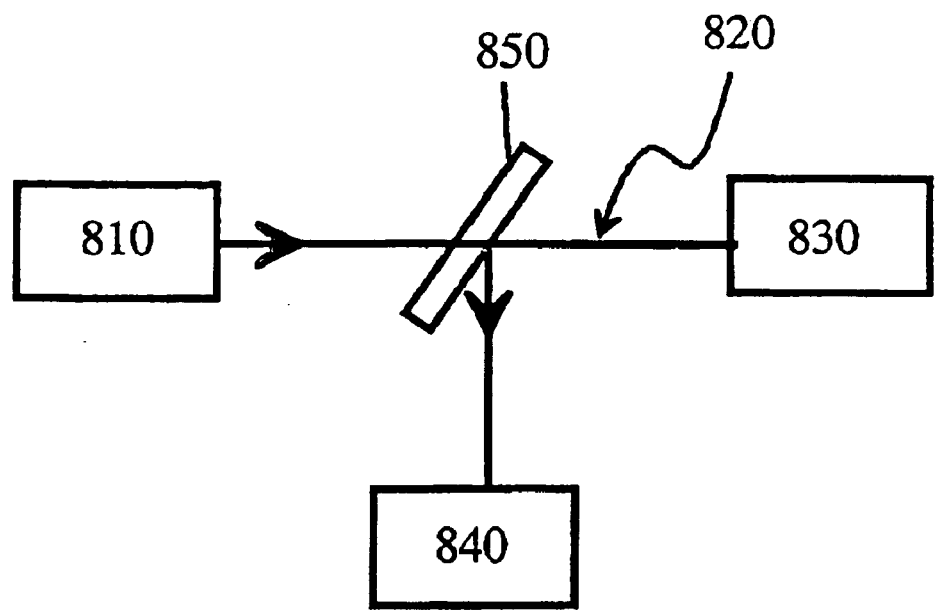

FIGS. 11A and 11B show application concepts of the wavelength-swept laser capable of producing continuous output.

Referring to FIG. 11A, the output from a wavelength-swept laser 810 passes through an optical system 830 after travelling along an optical path 820 such as an optical fiber. The light passed through the optical system 830 is detected by an optical detector 840 to analyze the wavelength characteristics of the optical system 830 in a time domain. Such optical systems includes, for example, a wavelength filte, an optical device such as an optical switch using non-linear effect, a grating sensor or an interferometric optical sensor, optical fiber communication system and the like. With high wavelength sweep repetition rate, the laser 810 can analyze the fast dynamic characteristics of the optical system 830 which was not realized by a conventional slow spectrum analyzer.

Referring to FIG. 11B, the wavelength characteristics of the light reflected by the optical system 830 is analyzed. A beam splitter 850 is disposed in the optical path to control the beam direction.

The lasers can be used in analyzing various optical devices or systems. Therefore, the present invention is applicable to optical sensing or WDM optical communication field.

What is claimed is:

1. A wavelength-swept pulse laser, structured to produce a mode-locked short pulsed output, the wavelength-swept pulse laser comprising:

a resonator having an optical path, the optical path including an optical gain medium capable of amplifying light over a range of wavelengths, a wavelength tunable filter with a center wavelength, and a non-linear medium with a refractive index that is light intensity dependent;

an optical pump for creating a population inversion in the optical gain medium; and a filter modulation signal generator coupled to the wavelength tunable filter, the wavelength-swept laser structured to mode lock the short pulsed output by continuously varying the center wavelength of the wavelength tunable filter and by self phase modulation of the light in the non-linear medium.

2. The laser of claim 1, the optical gain medium selected from the group consisting of a rare earth ion doped single mode optical fiber, a rare earth ion doped single mode planar waveguide, a titanium doped sapphire crystal, and a Nd—YVO$_4$ crystal.

3. The laser of claim 1, the optical gain medium comprising a semiconductor amplifier.

4. The laser of claim 3, the optical pump comprising an electrical current generator structured to generate a current whose intensity modulation frequency is equal to an integral multiple of the intermode spacing of longitudinal resonator modes, which results the gain constant modulation of the semiconductor amplifier, whereby the wavelength-swept pulse laser generates mode-locked optical pulses and its pulse generation timing is appropriately adjusted.

5. The laser of claim 1, the wavelength tunable filter selected from the group consisting of an acousto-optic wavelength tunable filter, a Fabry-Perot interferometric wavelength tunable filter, and a reflective diffraction grating with a variable reflective center wavelength that depends upon a rotation of the grating.

6. The laser of claim 1, the wavelength tunable filter comprising:

a beam deflector for controlling the direction of propagating light; and an optical device capable of producing low optical loss only within a determined frequency range when the light is coupled to the resonator by the beam deflector.

7. The laser of claim 1, the non-linear medium comprising a length of single mode optical fiber.

8. The laser of claim 1, the non-linear medium comprising a semiconductor saturable absorber that enhances the self-phase modulation effect, whereby the non-linear medium helps the generation of mode-locked optical pulses.

9. The laser of claim 1, the optical gain medium of comprising one optical device that also acts as a non-linear medium.

10. The laser of claim 9, the optical gain medium selected from the group consisting of a rare earth ion doped optical fiber with a non-linear refractive index change and a titanium doped sapphire crystal.

11. A method of producing mode-locked laser pulses comprising:

providing a resonator having an optical path, the optical path including an optical gain medium capable of amplifying light over a range of wavelengths, a wavelength tunable filter with a center wavelength whose loss is minimum thereabout, and a non-linear medium with a refractive index that varies according to a light intensity;

transmitting optical pulses in the non-linear medium to broaden the spectrum of the optical pulses by self-phase modulation and, concurrently, continuously varying the center wavelength of the wavelength tunable filter to mode-lock the laser pulses; and amplifying components of the optical pulses around the center wavelengths.

12. The method of claim 11, wherein continuously varying the center wavelength of the wavelength tunable filter comprises continuously tuning the wavelength tunable filter so that a variation speed V of the center wavelength of the wavelength tunable filter is substantially greater than a constant critical speed $Vc=[\ln(r)]*\Delta^4 l/b^2$ for most of a wavelength sweeping time, whereby a plurality of resonator modes can simultaneously oscillate, where $\Delta$ is the wavelength spacing between resonator modes, b is the full width at half maximum, and r is the ratio of the maximum to the minimum light intensity for each mode.

13. The method of claim 11, further comprising: applying an electrical signal to the wavelength tunable filter, and continuously and periodically sweeping, over a predetermined range, at least one selected from the group consisting of a frequency of the electrical signal and a voltage of the electrical signal.

14. The method of claim 13, further comprising superimposing an electrical pulse whose duration time is shorter than the resonator roundtrip time of light over the front portion of each repeating waveform of the electrical signal, thereby tuning pulse generation timing to the electrical pulse as well as helping the generation of optical pulses.

15. A laser comprising:
   a resonator having an optical path including therein an optical gain medium capable of amplifying light over a wavelength band, a wavelength tunable filter with a minimum loss center wavelength range, and a non-linear medium with a light intensity dependent refractive index;
   an optical pump for creating a population inversion in the optical gain medium; and
   a filter modulation signal generator coupled to the wavelength tunable filter, the filter modulation signal generator structured to produce a wavelength-swept laser output of a short mode-locked pulse type by continuously varying the minimum loss center wavelength range of the wavelength tunable filter.

16. The laser of claim 15, the optical gain medium selected from the group consisting of a rare earth ion doped single mode optical fiber, a rare earth ion doped single mode planar waveguide, a titanium doped sapphire crystal, and a Nd—YVO$_4$ crystal.

17. The laser of claim 15, the optical gain medium comprising a semiconductor amplifier.

18. The laser of claim 17, the optical pump comprising an electrical current generator structured to generate a current whose intensity modulation frequency is equal to an integral multiple of the intermode spacing of longitudinal resonator modes.

19. The laser of claim 15, the wavelength tunable filter selected from the group consisting of an acousto-optic wavelength tunable filter, a Fabry-Perot interferometric wavelength tunable filter, and a reflective diffraction grating with a variable reflective center wavelength that depends upon a rotation of the grating.

20. The laser of claim 15, the wavelength tunable filter comprising:
   a beam deflector for controlling the direction of propagating light; and
   an optical device capable of producing low optical loss only within a determined frequency range when the light is coupled to the resonator by the beam deflector.

21. The laser of claim 15, the non-linear medium comprising a length of single mode optical fiber.

22. The laser of claim 15, the non-linear medium comprising a semiconductor saturable absorber that enhances the self-phase modulation effect, whereby said non-linear medium helps the generation of mode-locked optical pulses.

23. The laser of claim 15, the optical gain medium comprising one optical device that also acts as a non-linear medium.

24. The laser of claim 23, the optical gain medium selected from the group consisting of a rare earth ion doped optical fiber with a non-linear refractive index change and a titanium doped sapphire crystal.

* * * * *

UNITED STATES PATENT AND TRADEMARK OFFICE
CERTIFICATE OF CORRECTION

PATENT NO. : 6,816,515 B1
DATED : November 9, 2004
INVENTOR(S) : Yun et al.

It is certified that error appears in the above-identified patent and that said Letters Patent is hereby corrected as shown below:

Column 4,
Line 34, please replace "change $f_{F1}$ in the center" with -- change $f_{FI}$ in the center --.
Line 36, please replace "so that $f_{FS}$ and $f_{F1}$ have a" with -- so that $f_{FS}$ and $f_{FI}$ have a --.
Line 63, please replace "of pump power," with -- of pump power; --.

Column 7,
Line 45, please replace "including a nonlinear medium" with -- including a non-linear medium --.

Column 8,
Line 11, pleace replace "and a Nd — $YVO_4$" with -- and a Nd-$YVO_4$ --.
Line 25, please replace "additional nonlinear medium" with -- additional non-linear medium --.

Column 9,
Line 40, please replace "ns , and all pulses" with -- ns, and all pulses --.

Column 11,
Line 31, please replace "and nonlinear parameter" with -- and non-linear parameter --.
Line 48, please replace "Gaussian-shaped:" with -- Gaussian-shaped. --.

Column 12,
Line 40, please replace "of 54 Mz frequency" with -- of 54 MHz frequency --.

Column 13,
Line 18, please replace "change by $f_{F1}$" with -- change by $f_{FI}$ --.
Line 21, please replace "so that $f_{FS}$ and $f_{F1}$" with -- so that $f_{FS}$ and $f_{FI}$ --.
Line 24, please replace "$f_{F1}$, the laser" with -- $f_{FI}$, the laser --.
Line 39, please replace "a wavelength filte," with -- a wavelength filter, --.

UNITED STATES PATENT AND TRADEMARK OFFICE
CERTIFICATE OF CORRECTION

PATENT NO. : 6,816,515 B1
DATED : November 9, 2004
INVENTOR(S) : Yun et al.

It is certified that error appears in the above-identified patent and that said Letters Patent is hereby corrected as shown below:

<u>Column 14,</u>
Line 11, please replace "Nd—YVO$_4$" with -- Nd-YVO$_4$ --.
Lines 41 and 42, please replace "gain medium of comprising" with -- gain medium comprising --.

<u>Column 15,</u>
Line 3, please replace "Vc=[1n(r)*$\Delta^4$ 1/b$^2$" with -- Vc=[1n(r)*$\Delta^4$ ]/b$^2$ --.

<u>Column 16,</u>
Line 3, please replace "Nd—YVO$_4$" with -- Nd-YVO$_4$ --.

Signed and Sealed this

Thirteenth Day of December, 2005

JON W. DUDAS
*Director of the United States Patent and Trademark Office*